INVENTORS
CLIFFORD W. BOSSMANN,
HARLAND A. KAUFMANN &
CHARLES E. MATHES

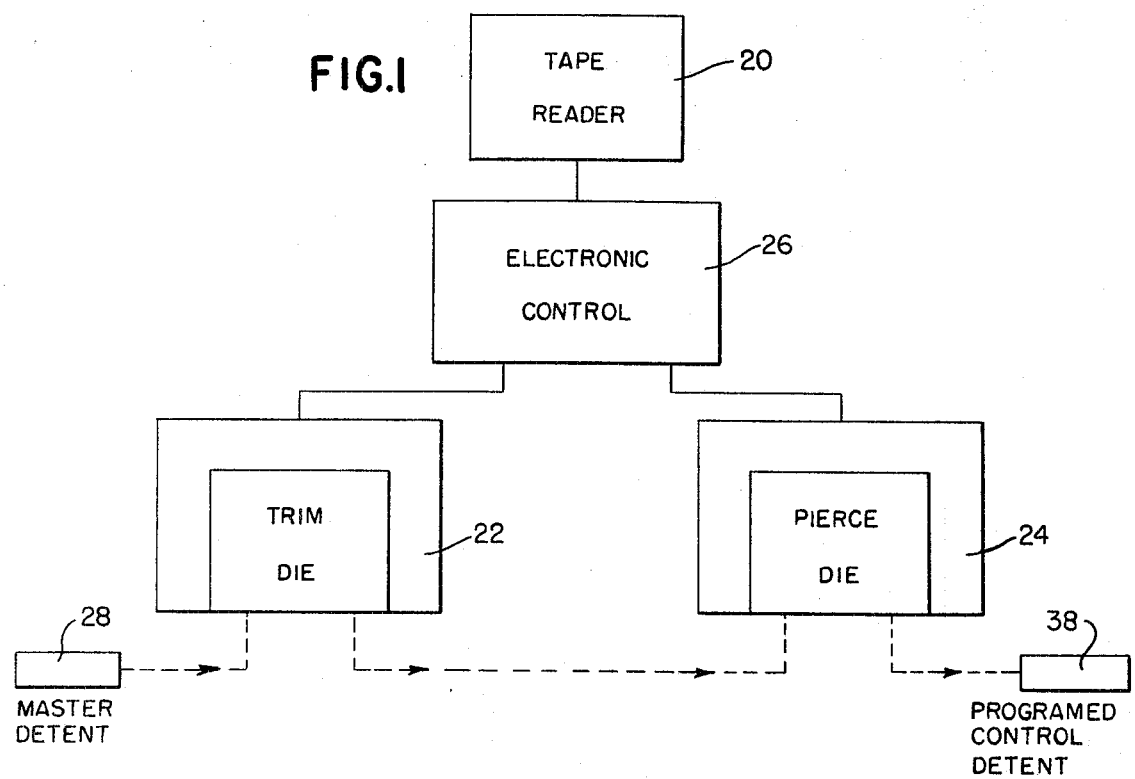
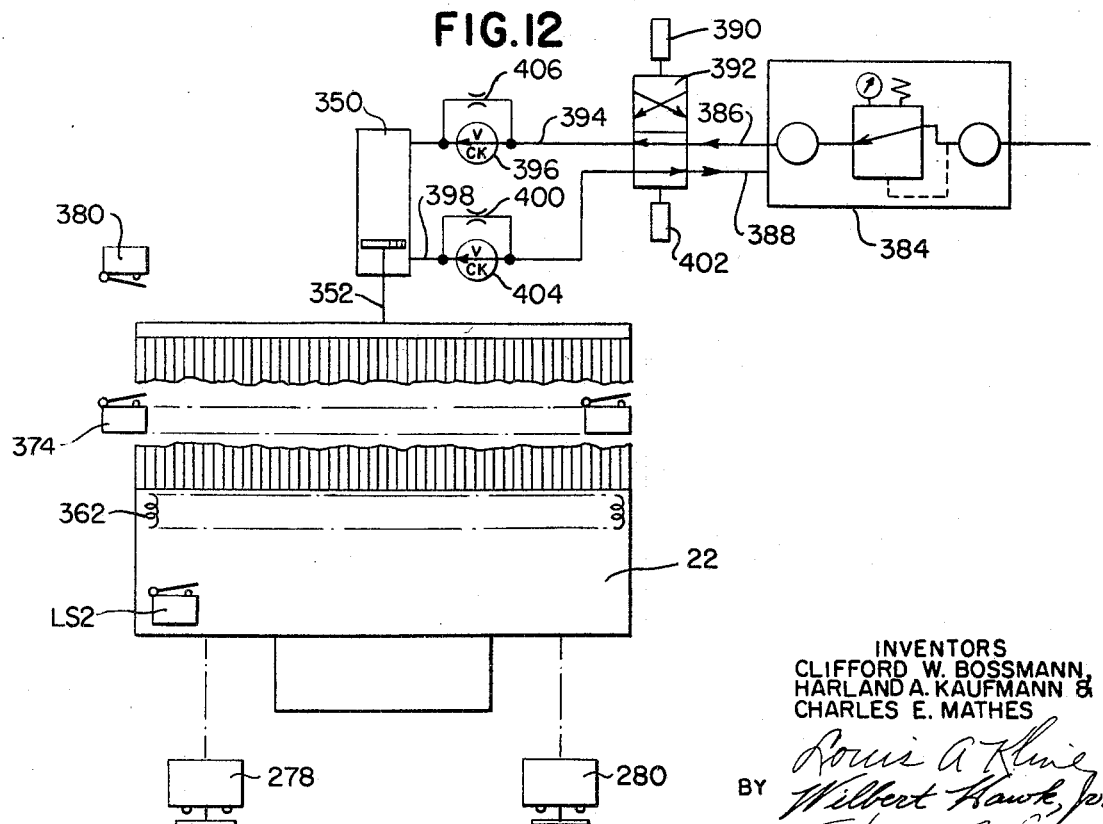

BY

THEIR ATTORNEYS

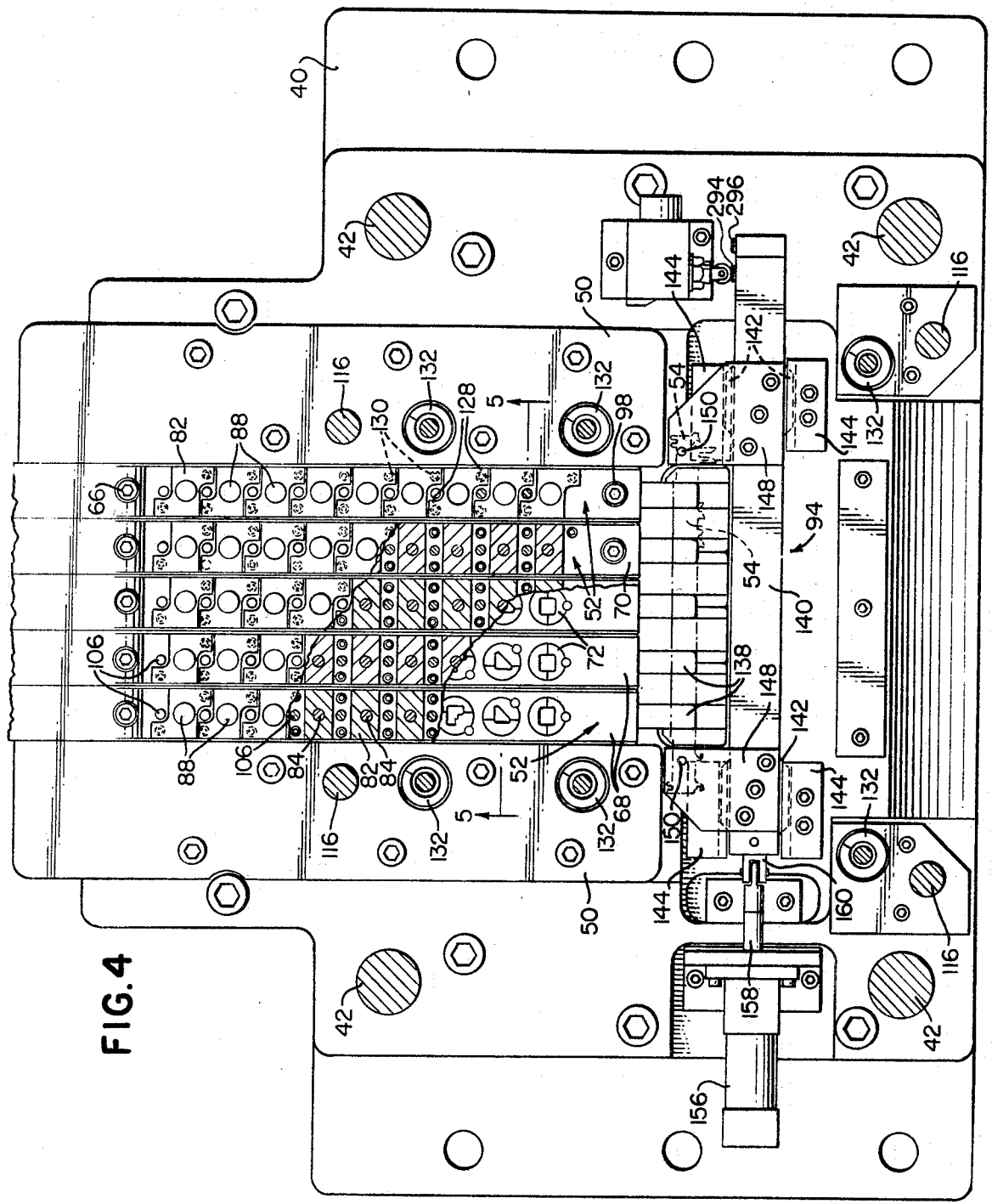

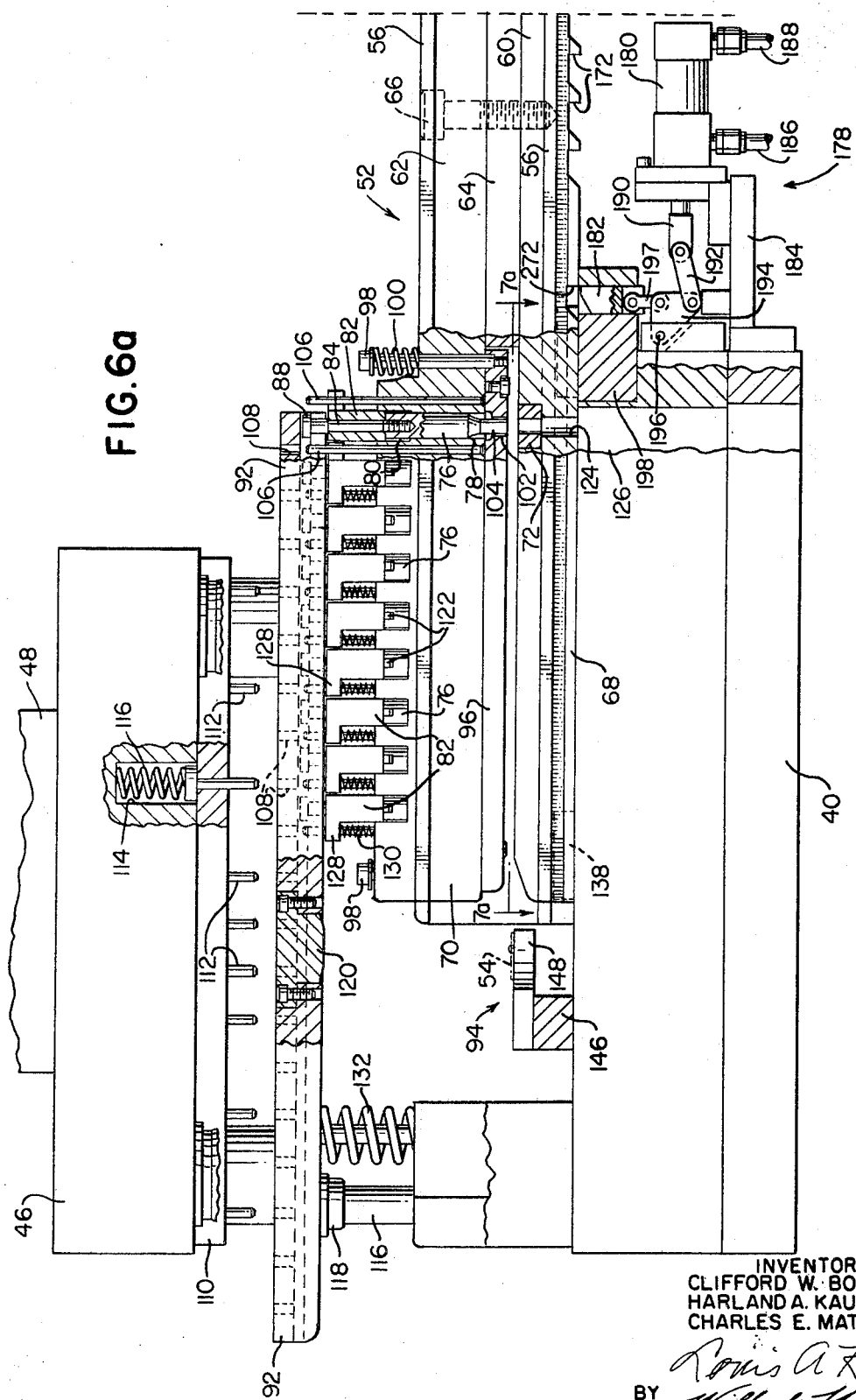

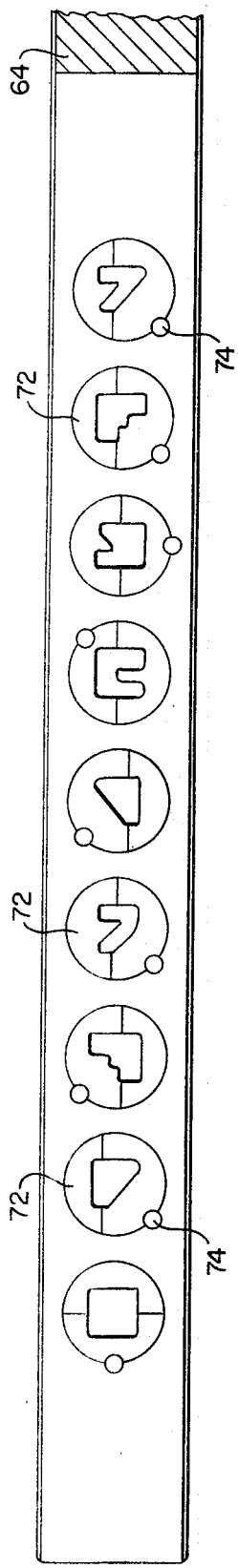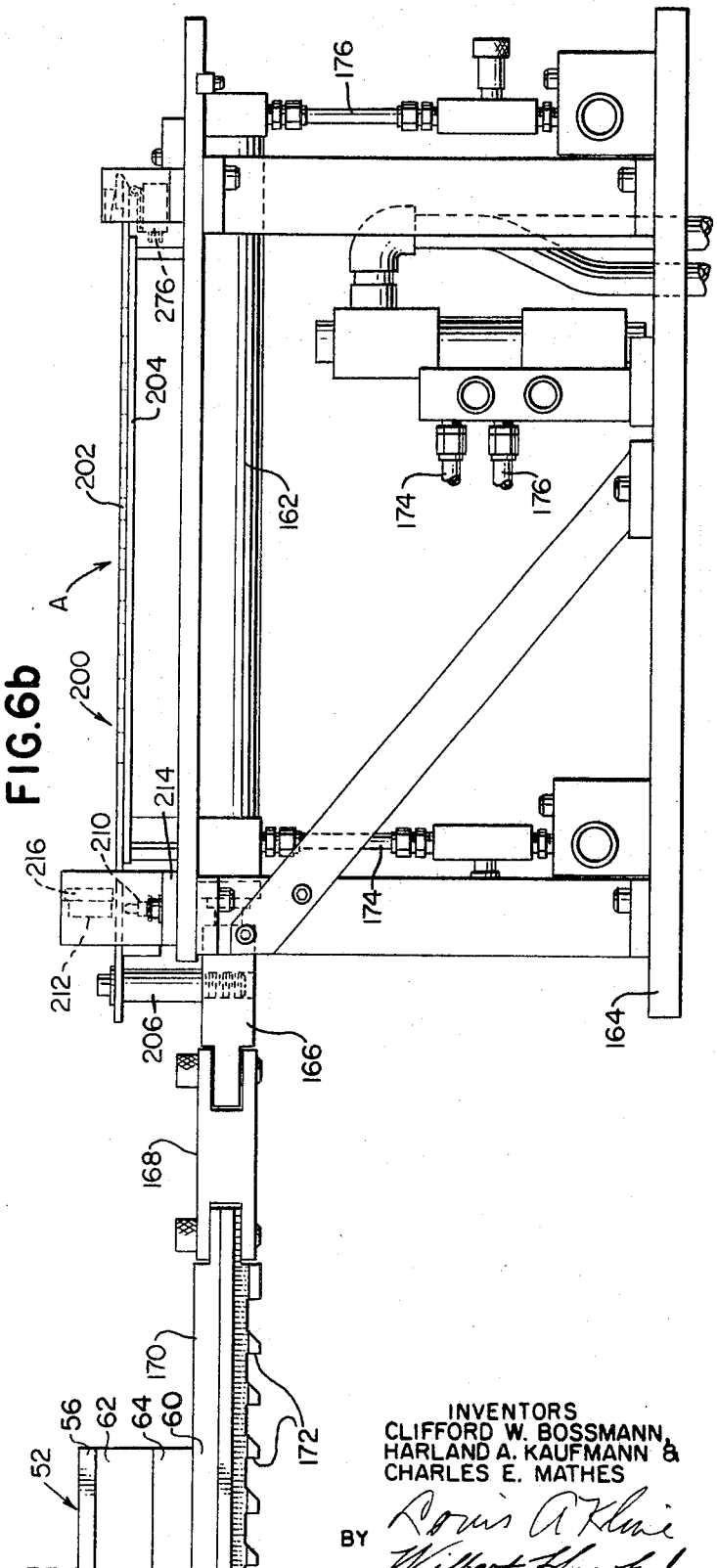

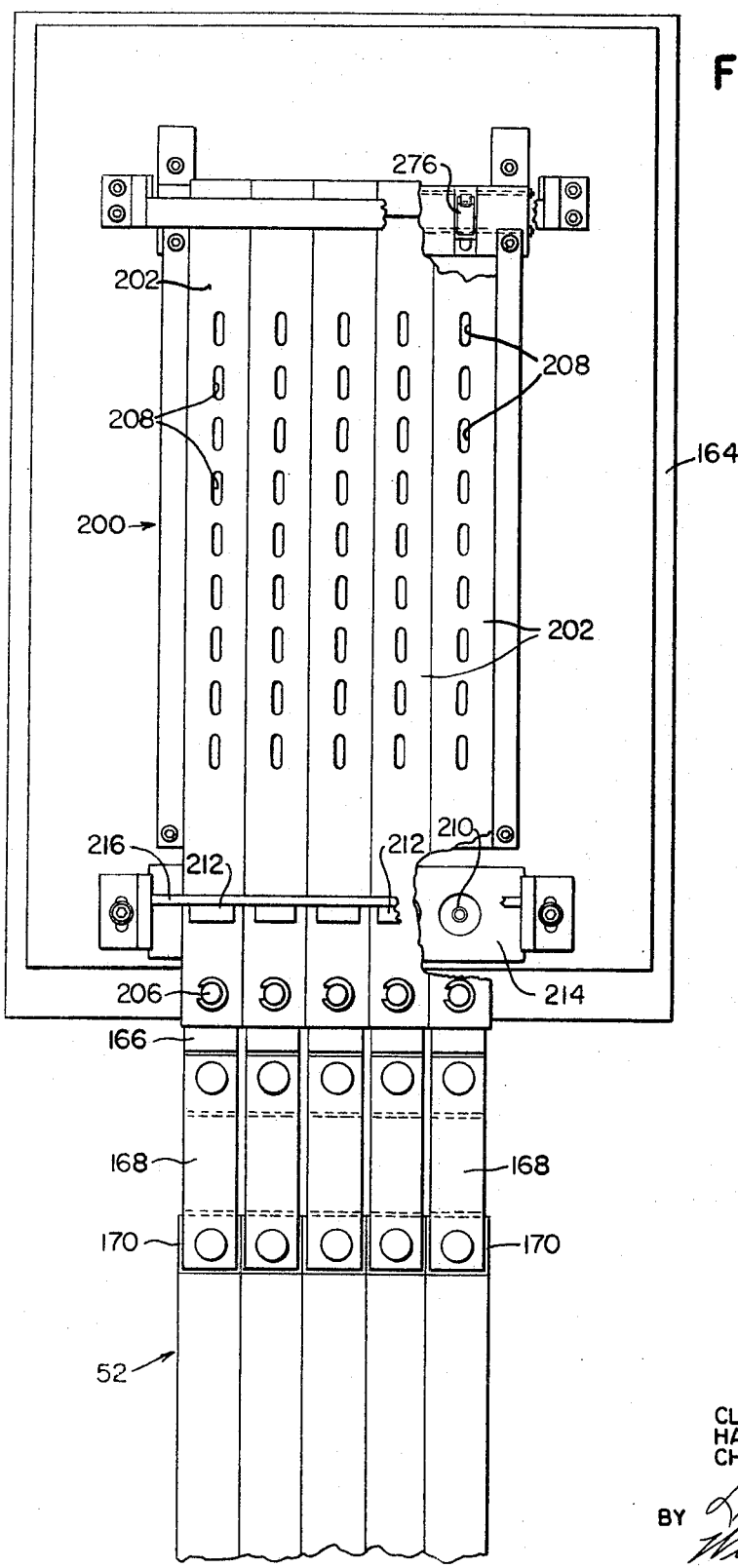

May 19, 1970  C. W. BOSSMANN ET AL  3,512,435
APPARATUS FOR PRODUCING A SET OF CONTROL DETENTS
FOR A BUSINESS MACHINE
Filed Oct. 9, 1967  11 Sheets-Sheet 8

INVENTORS
CLIFFORD W. BOSSMANN,
HARLAND A. KAUFMANN &
CHARLES E. MATHES
BY
THEIR ATTORNEYS

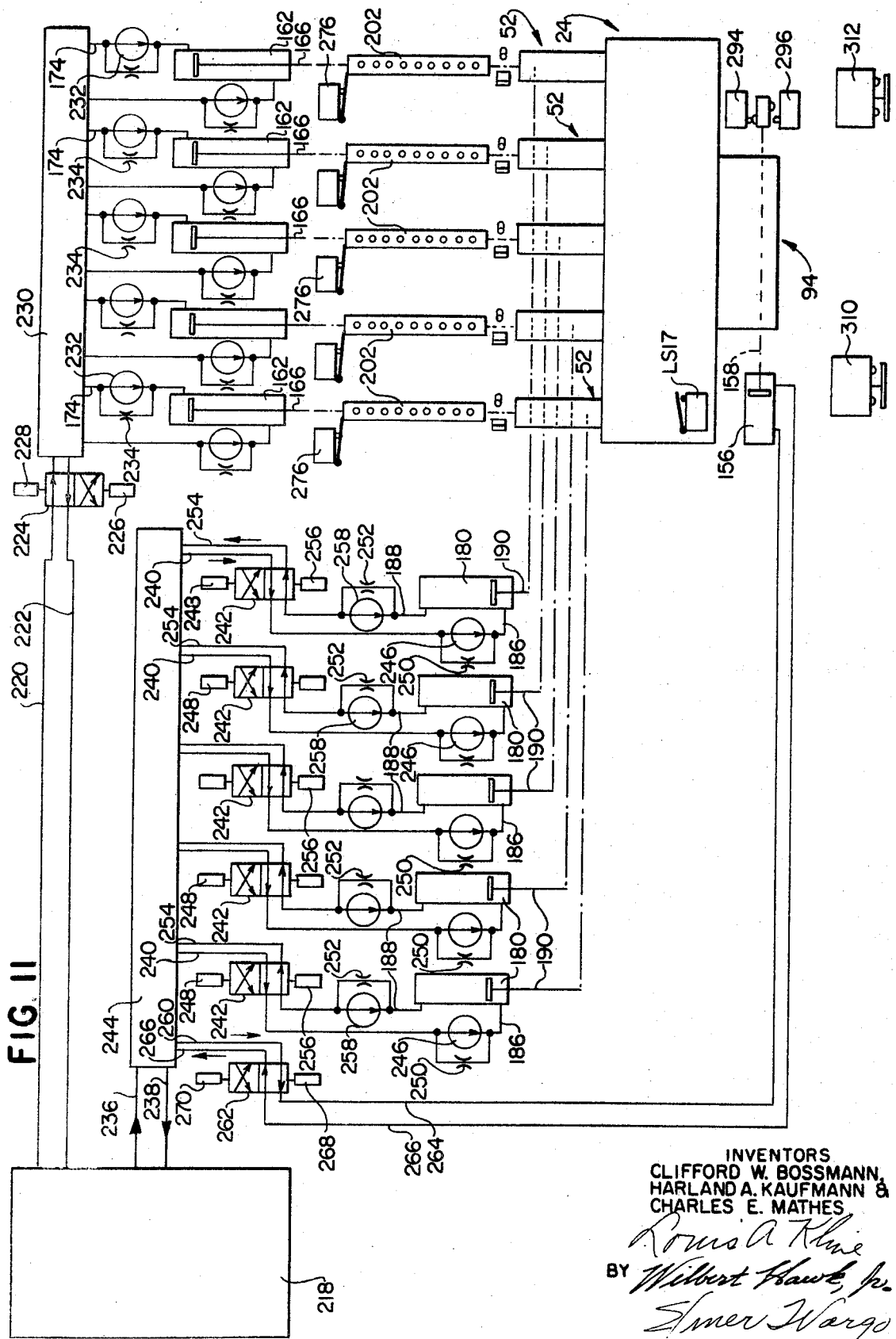

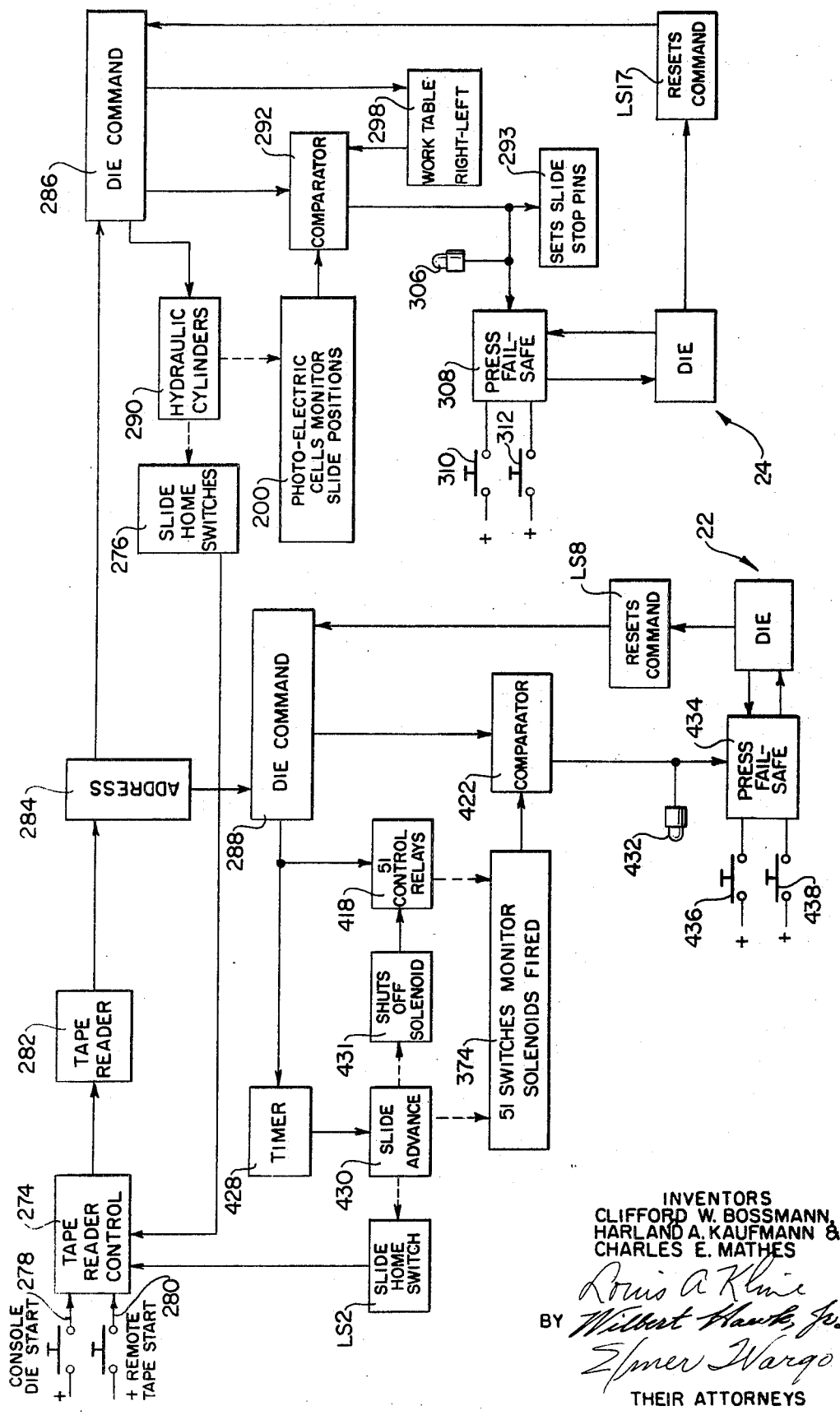

United States Patent Office 3,512,435
Patented May 19, 1970

3,512,435
APPARATUS FOR PRODUCING A SET OF CONTROL DETENTS FOR A BUSINESS MACHINE
Clifford W. Bossmann, Harland A. Kaufmann, and Charles E. Mathes, Dayton, Ohio, assignors to The National Cash Register Company, Dayton, Ohio, a corporation of Maryland
Filed Oct. 9, 1967, Ser. No. 673,829
Int. Cl. B26d 5/30, 5/04
U.S. Cl. 83—71                                 10 Claims

ABSTRACT OF THE DISCLOSURE

A method and apparatus for producing a set of control detents for a business machine like a cash register. The method includes trimming off the unwanted external control surfaces on a control detent blank and then forming the internal control surfaces desired on said blank as controlled by a punched tape. A special die construction having five shiftable die units is used in the forming operation. Each die unit has nine different die sets which can be selectively positioned over the blank to effect the forming operation in response to instructions from said tape.

BACKGROUND OF THE INVENTION

This invention relates to an apparatus for producing a set of control detents for business machines, like cash registers and accounting machines. The apparatus includes a noval die construction which is used to form certain of the control surfaces on said control detents.

When making business machines such as cash registers and accounting machines, it is frequently necessary to design the machines to satisfy the special needs of customers. Satisfying these needs often requires that much of the basic business machine itself be specifically altered and designed to accomplish the desired internal control of the machine. It is apparent that such special designing is time-consuming and expensive. Fabrication time for the special machine is also increased along with the cost of producing it.

SUMMARY OF THE INVENTION

In an effort to reduce the time and expense involved in producing versatile business machines, like cash registers, a new approach was used in the design of the basic business machine to be used in satisfying customers' special requirements. Stated briefly, the approach included anticipating as many of the special control requirements which could reasonably be expected by users of the machines so as to design a basic programmable business machine. With a basic machine, a group of control detents could be inserted into the machine to program or control the internal functioning thereof. When a different internal control of a machine is required, a different group of control detents could be made and inserted into the machine to effect the changes in internal control required. In one cash register embodiment, a group of control detents may include up to sixty individual control detents; however, "average" customer requirements necessitate the use of about forty detents per group.

Information for a customer's special order requirements is fed into a computer which designs the necessary control detent data and outputs the design data onto a numerical control tape which contains all the information necessary to produce a group of control detents. The control tape is then delivered to a production center, where it is used to control the production of the group of detents.

At a production center, a control detent blank is positioned in a trimming die. The blank is produced with all the external control surfaces expected to be needed and none of the internal control surfaces expected to be needed, as these internal control surfaces will be produced in a subsequent forming operation. At the trimming die, the unwanted external control surfaces on the blank are trimmed or sheared off in response to the requirements of the control tape. After the trimming operation, the partially completed control detent is positioned in a second die construction, which is used to form or pierce the internal control surfaces therein to produce a completed detent in response to the requirements of the control tape. The remaining control detents required to produce a group of control detents for a specific machine are similarly produced in consecutive order.

The second die construction mentioned in the previous paragraph forms a part of this invention and includes a plurality of die units which are reciprocably mounted in parallel relationship with one another. Each die unit has a plurality of cooperating die sets thereon, with each die set including a punch and a die. The individual die units are advanced towards a work station, in which the partially completed control detent is positioned, so as to position selected die sets at said work station in response to the requirements of the control tape. The ram of the press in which the die construction is located is then lowered to perform the forming operation. The control detent is then shifted at the work station, and the die units return to a home position, from which they advance to perform a second forming operation in response to the requirements recorded on the control tape, thereby completing the production of a control detent.

BRIEF DESCRIPTION OF THE DRAWINGS

FIG. 1 is a diagram, in block form, showing the general method of producing a set of control detents for a business machine according to this invention.

FIG. 4 is a plan view of a portion of the die construction shown in FIG. 2 and is taken along the line 4—4 of FIG. 2, with certain elements thereof broken away to facilitate the showing thereof.

FIGS. 6a and 6b, when taken together, show a side elevational view of one of the reciprocating die units of the die construction and its actuator means.

FIG. 7 is a plan view looking in the direction A of FIG. 6b and showing further details of the actuator means for the individual die units.

FIG. 7a is a plan view of the top of the extension of the lower die unit in which the die inserts are located, and is taken along the line 7a—7a of FIG. 6b.

FIG. 11 is a general schematic diagram of the actuator means for the individual reciprocating die units for the forming die construction of this invention.

FIG. 12 is a general schematic diagram of the actuator means for the trimming die construction of this invention.

FIG. 13 is a general schematic diagram of the control means used to operatively connect the trimming and forming die constructions with the record medium which dictates the control surfaces required to produce a complete set of control detents for a particular business machine.

DESCRIPTION OF THE PREFERRED EMBODIMENT

FIG. 1 is a diagram in block form showing the general method of producing a set of control detents for a business machine like a cash register or an accounting machine. In one cash register embodiment, for example, three banks of up to twenty control detents each are required, making a maximum total of up to sixty control detents required per register. These control detents are programmable in that their exterior control surfaces and internal control surfaces are made according to customer requirements.

When customer orders are received for such cash registers, for example, the requirements for a particular register are fed into a computer system (not shown), which designs the necessary programmable parts and assemblies, including the set of control detents for that particular cash register. The computer system outputs the required design information onto a numerical control tape, hereinafter called an N/C tape. All the information required to produce the programmable parts for one cash register is recorded on one tape. The N/C tape is then processed and cut into sections, each section containing all the information necessary to produce a specific group of parts or an assembly, as, for example, a set of control detents. The instant application relates only to the production of a set of control detents for controlling the internal functioning of the machine.

All the information for producing a set of control detents for one business machine is recorded on one N/C tape, which is fed into the tape reader 20 (FIG. 1) to begin the production of the detents. The basic units for producing the control surfaces on the detents include a trim die construction 22 and a pierce die construction 24, which are operatively connected to the tape reader 20 by control means 26 shown only diagrammatically in FIG. 1, which control means will be described later. The first step in producing the detents includes a trimming operation performed on a control detent blank at the trim die construction 22.

Figure 8:
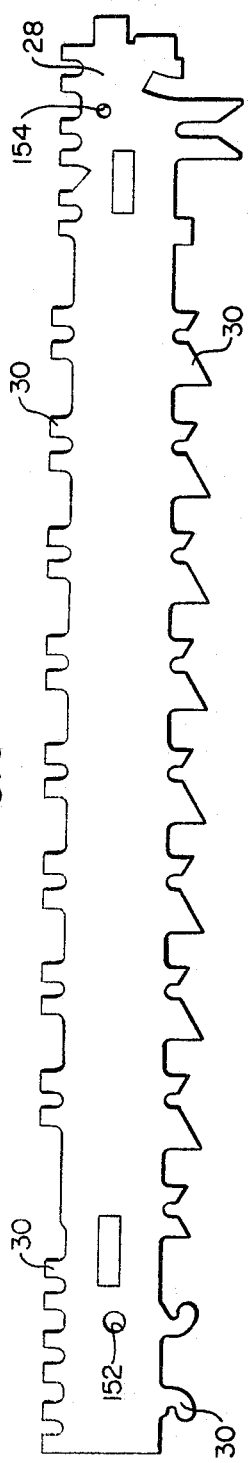
FIG. 8 is a plan view of one form of the control detent blank with all the external control surfaces thereon and with none of the internal control surfaces formed thereon.

A typical blank 28, from which a completed control detent is produced is shown in FIG. 8. This blank 28 includes all the external control surfaces, such as the various surfaces marked 30, expected to be needed in controlling the functions of any specific business machine which can reasonably be expected to be ordered by a customer. A separate conventional stamping operation is utilized to produce the blank 28 shown in FIG. 8.

Figure 9:
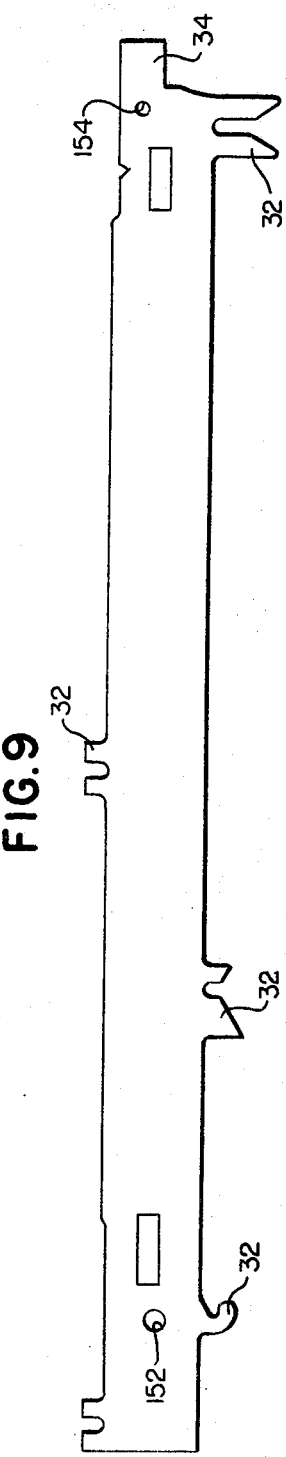
FIG. 9 is a plan view of a partially completed detent after the trimming operation which removes the unwanted exterior control surfaces.

The blank 28 is positioned in the trim die construction 22 (FIG. 1), and the punch press (not shown), in which the die construction is located, is actuated to perform the trimming operation. The die construction 22, to be described later, is effective to trim off all those external control surfaces not needed, as controlled by the requirements of the N/C tape fed into the tape reader 20, to leave only those external control surfaces, such as 32 in FIG. 9, which are needed on that particular detent for the set of control detents being made.

The partially-completed control detent 34 (FIG. 9) is then removed from the trim die construction 22, or first work station, and is moved to a second work station, which includes the pierce-die construction 24 (FIG. 1). When the partially completed control detent 34 is positioned in the die construction 24, the punch press (not shown), in which said die construction is located, is actuated, and the internal control surfaces 36 are formed on said detent as controlled by the requirements of the N/C tape to produce a completed control detent 38, shown in FIG. 10. These internal and external control surfaces 36 and 32, respectively cooperate with other control elements, such as keys within the business machine, to effect the required internal control thereof. As mentioned earlier, a set of control detents for a business machine such as a cash register may typically require up to sixty control detents.

After the first of said control detents is completed, a second control detent blank 28 is positioned in the trim die construction 22, and the trimming and forming operations previously mentioned are performed upon the blank 28 to produce a second completed control detent 38 as controlled by the requirements of the N/C tape. It should be noted that, when a detent 28 is in the blank form shown in FIG. 8 and the partially-completed form shown in FIG. 9, none of the internal control surfaces are formed thereon. As the control detents are completed at the trimming and forming operations, they are maintained in consecutive order until a complete set of detents is formed. Further details of the trimming and forming operations performed in producing the control detents will be described in relation to the specific trimming and forming die constructions 22 and 24 respectively, used in these operations.

Figure 2:
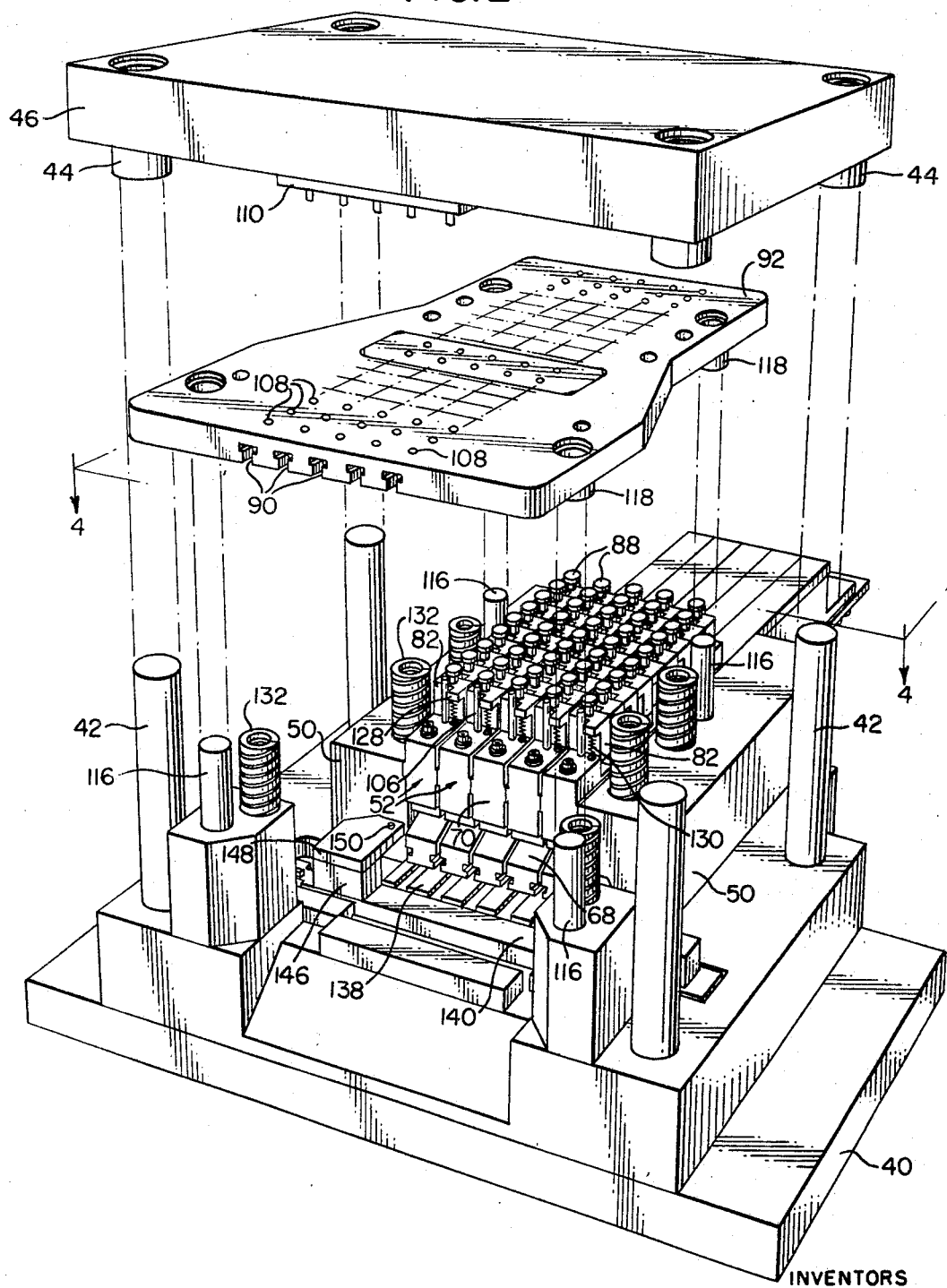
FIG. 2 is an exploded view, in perspective, of the die construction, of this invention, which is used in forming the internal control surfaces of the individual control detents making up the set of detents used in a business machine.
Figure 10:
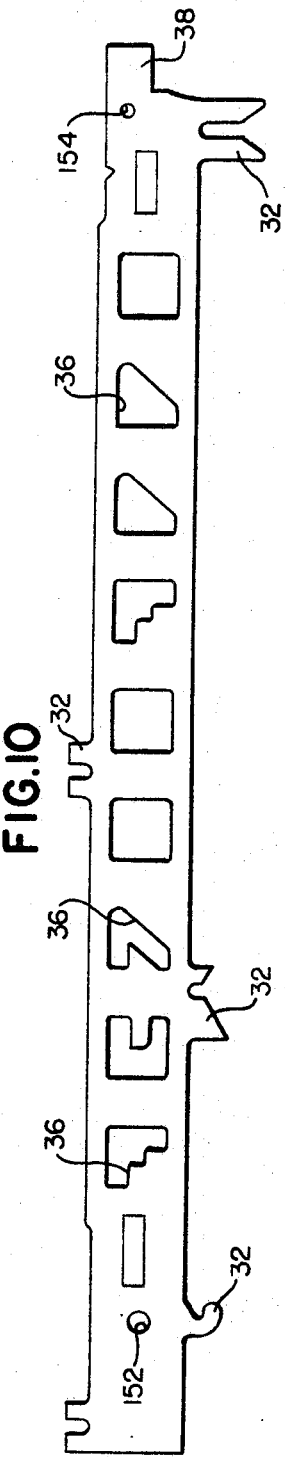
FIG. 10 is a plan view of a completed control detent after the forming operation which produces the interior control surfaces.

FIG. 2 is a general exploded view, in perspective, of the die construction 24 used in forming the internal control surfaces 36 shown on the completed detent 38 of FIG. 10. The die construction 24 includes a bolster plate 40 adapted to be secured to the bed of a press (not shown). The plate 40 has guide pins 42 upstanding therefrom, on which bushings 44 are slidably mounted. These bushings 44 are secured to an upper plate 46, which, in turn, is secured to the ram 48 (FIG. 3) of a press.

Figure 3:
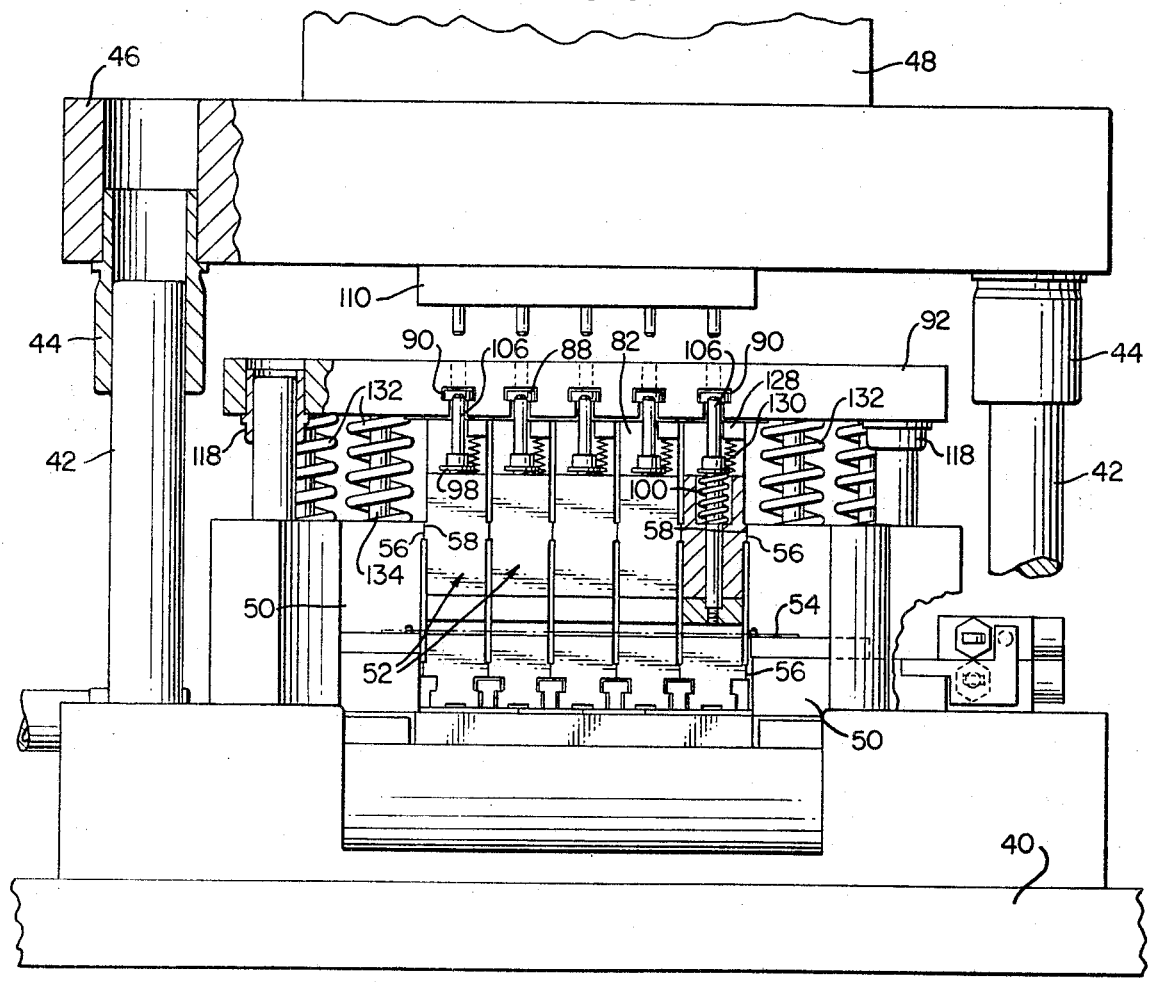
FIG. 3 is a front elevational view showing the die construction of FIG. 2 in assembled form.

The die construction 24 also includes two spaced, parallel supports 50 (FIGS. 2, 3, 4, and 5) or guide members, between which a plurality of die units 52 are mounted for reciprocating movement relative to a work piece 54, shown in dashed outline in FIG. 4. The supports 50 are secured to the bolster plate 40, and each support is provided with projecting guide surfaces 56 (best shown in FIGS. 3 and 5), against which the outermost ones of the die units 52 slide when reciprocated. Each die unit 52 has, on opposed sides thereof, cooperating guide surfaces 58, which extend along its length and provide a bearing and locating surface for the particular die unit. As best seen in FIG. 3, the guide surfaces 58 of the outermost die units 52 engage the guide surfaces 56 of the supports 50, and the guide surfaces 58 of the innermost ones of the die units 52 engage the guide surfaces 58 of the adjacent die units 52. This construction provides the sole means for locating the individual die units 52 laterally (from a left to a right direction, as viewed in FIG. 3) relative to the work piece.

The die units 52 are constructed in the following manner. Each die unit has a lower half 60 (FIG. 6a) and an upper half 62, separated by a spacer block 64 and secured together by fasteners 66, whose heads fit into suitable recesses in the upper half 62. The lower half 60 has an extension 68, which is spaced from an extension 70 of the upper half 62. The extension 68 of the lower half 60 has a plurality of die inserts 72 therein (best shown in FIG. 7a), and in the embodiment shown there are nine such inserts. The inserts 72 are conventional and are located in the extension 68 by locating pins 74, which orient the halves of a particular die insert with its cooperating punch.

The cooperating punches for the die inserts 72 are mounted in the extension 70 of the upper half 62 as follows. For each die insert 72, there is provided a cooperating punch 76, best shown in FIG. 6a. Each punch 76 is slidably mounted in a bore 78, whose upper end 80

(as viewed in FIG. 6a) is rectangular in cross section to receive the block 82, which is secured to its respective punch 76 by a fastener 84. The fastener 84 has an enlarged diameter portion with a shoulder 86 thereon, which abuts against the upper surface of the block 82 (as viewed in FIG. 6a) to thereby secure it to its punch 76, and the fastener also has a head 88. Both the head 88 and the shoulder 86 of the fastener 84 slide in a T-shaped slot 90, which is located in the middle plate 92, as best shown in FIG. 5.

Figure 5:
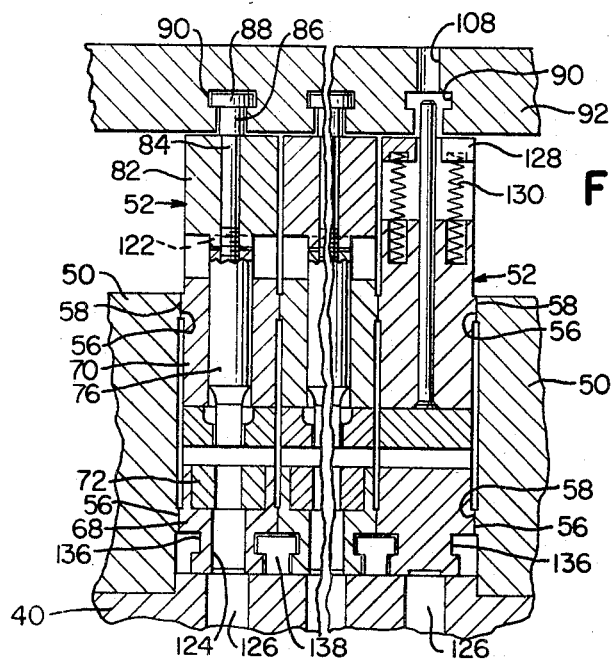
FIG. 5 is a front elevational view, in cross section, of a portion of the die construction, and is taken along the line 5—5 of FIG. 4.

As can be seen from FIGS. 2, 3, and 5, one such T-shaped slot 90 is provided in the middle plate 92 for each die unit 52. These slots 90 are arranged in spaced, parallel relationship, so that they are aligned with their respective die units 52, so as to enable them to reciprocate freely, as required to position the particular combination of punch 76 and die insert 72 at the work station 94 (FIG. 6a) at which the work piece 54 is positioned. The general construction of the punches 76 and die inserts 72 is the same for all such combinations; however, the actual configurations of the individual combinations to form the internal control surfaces may be different, as shown in FIG. 7a. The combinations selected for the forming or piercing operation will vary, depending upon the particular requirements of the business machine in which the control detents 38 are used.

The head 88 of the fastener 84 also cooperates with the middle plate 92 to withdraw the individual punches 76 from their respective die units 72 upon the movement of the ram 48 away from said die units. As best seen in FIG. 6a, a pressure plate 96 (one being provided for each die unit 52) is resiliently secured to the underside of the extension 70 of the upper half 62 of its associated die unit 52 by fasteners 98 and springs 100. Each spring 100 is placed in compression and operates to urge the plate 96 against the extension 70. The pressure plate 96 is provided with an opening 102 (FIG. 6a) for each punch 76, through which the forming end 104 thereof freely passes. The extension 70 of each die unit 52 is also provided with a plurality of aligned spaced holes, into which pins 106 are slidably mounted. The lower ends of the pins 106 (as viewed in FIG. 6a) are flattened to engage the pressure plate 96, while their upper ends are positioned in the T-shaped slots 90 to permit the individual die units 52 to be reciprocated relative to the middle plate 92. The plate 92 has a plurality of spaced holes 108, which are arranged in rows which are aligned with the slots 90, as shown in FIGS. 2 and 3. When a particular die unit 52 (FIG. 6a) is moved into position (by actuator means to be described later) to enable the appropriate combination of punch 76 and die unit 72 to be positioned at the work station 94, the pins 106 are aligned with the holes 108, the middle plate 92 being stationary at this time.

When the ram 48 begins to descend (FIG. 6a), it pushes the upper plate 46 towards the work station 94. Secured to the underside of the upper plate 46 is a plate 110, which has a plurality of pins 112 slidably mounted therein. The plate 46 has a hole 114 for each pin 112, in which hole a spring 116 is located to urge the head of the associated pin 112 against the plate 110. The pins 112 are aligned with the holes 108, so that, as the ram 48 descends, the pins 112 enter the holes 108 and engage the pertaining pins 106 to push them towards the work station 94. The pins 106 resiliently force the pressure plate 96 against the work piece 54 to hold it in place. As the ram 48 continues to descend, the plate 110 engages the middle plate 92 to move it towards the work station 94. The middle plate 92 is slidably mounted on posts 116 (FIGS. 2 and 3) by conventional bushings 118 for parallel movement towards and away from the work station 94. Upon further movement of the ram 48 towards the work station 94, hardened pieces 120, secured to the underside of the middle plate 92, engage the tops of the pertaining blocks 82 which are positioned at the work station 94, and move them and their associated punches 76 into the work piece 54 to perform the forming operation thereon and thereby produce the first, third, fifth, seventh, and ninth (counting from left to right) internal control surfaces 36 on the control detent 38 shown in FIG. 10. (The even-numbered internal control surfaces 36 on the control detent 38 are produced by a second forming operation to be described later.)

Each punch 76 is kept aligned with its associated die insert 72 by the block 82 to which it is secured. The block 82 has, on its bottom (as viewed in FIG. 5), a projection 122, which fits into a diametrically-located, cooperating recess on the top side of its associated punch 76 to prevent rotation of the punch as it is moved into its cooperating die insert 72. The scrap resulting from the punching operation falls through conventional slots 124 in the extension 68 and through slots 126 in the bolster plate 40 (FIGS. 5 and 6a). As can be seen in FIGS. 2, 4, and 6a, each block 82 is provided with projecting ears 128, which are located on diagonally opposite corners thereof. A compression spring 130 has one end located in an appropriate recess on the underside of each ear 128, and its other end is located in a recess (best shown in FIG. 5) on the top of the extension 70, and the springs 30 tend to urge the block 82 away from said extension.

When the ram 48 begins to move away from the work station 94 after the punching operation, the following events occur. As the upper plate 46 (FIG. 6a) moves away with the ram 48, the springs 130 begin to urge all blocks 82, including those blocks 82 positioned at the work station 94, towards the upper plate 46, tending to withdraw their respective punches 76 out of the pertaining die inserts 72. The middle plate 92 is urged away from the work station 94 by the action of the compression springs 132, which are shown in FIGS. 2, 3, 4, and 6a. A suitable adjustable rod 134 is located in the center of each spring 132, and the rod is used to adjustably control the extent of movement of the middle plate 92 away from the work station 94. As the middle plate 92 moves away from the work station 94, the fasteners 84 are carried therewith to withdraw the punches 76 from their die inserts 72. The length of the pins 112 is designed to enable the pins 106 to maintain pressure on the pressure plate 96 while the punches 76 are being withdrawn from their associated die inserts 72 to thereby maintain pressure on the work piece during withdrawal of the punches 76. After the punches are withdrawn, the ram 48 and the upper plate 46 have moved sufficiently far away from the work station 94 to enable the pins 112 to be disengaged from the pins 106, thereby permitting the springs 100 (FIG. 6a) to return the pressure plate 96 to the home position, shown.

While the punches 76 are being withdrawn from their respective die inserts 72, the extensions 68 are restrained from movement away from the bolster plate 40 by the construction best shown in FIG. 5. The extension 68 of each die unit 52 is provided with grooves 136 on opposed sides thereof, which extend along the entire length of the die unit 52. When two die units 52 are placed adjacent to each other, the grooves 136 thereon cooperate to form a T-shaped recess to receive a cooperating member 138, which also is T-shaped in cross section. Each member 138 is secured to the bolster plate 40 and permits the associated die units 52 to be reciprocated while still retaining the extensions 68 on the bolster plate 40.

It should be noted that, after the first forming operation, which forms the first, third, fifth, seventh, and ninth internal control surfaces (as read from left to right) of the control detent 38 shown in FIG. 10, the detent or work piece 54 is shifted at the work station 94 (FIG. 4), so that the remaining second, fourth, sixth, and eighth internal control surfaces can be formed therein.

The shifting of the work piece 54 (shown in dashed outline) at the work station 94 is accomplished by the construction best shown in FIG. 4. This construction includes a bar 140, which is slidably mounted on the bolster plate 40 for reciprocative movement perpendicular to the reciprocative movement of the individual die units 52. The bar 140 has tongues 142 on opposed sides, near its ends, which fit into mating grooves in blocks 144, which are secured to the bolster plate 40. Two spacer blocks 146, best seen in FIG. 2, are secured to the bar 140 and are spaced apart to permit the extensions 68 of the die units 52 to reciprocate therebetween. A locating plate 148 is secured to each spacer block 146, and each plate has a locating pin 150 upstanding therefrom, with one of the pins having a larger diameter than the other to insure proper orientation of the work piece in the work station 94. FIG. 8 shows the blank 28 for the control detent with orienting holes 152 and 154 (one of the holes being larger than the other) to properly orient the blank at the work station 94. Suitable magnets (not shown), located near the pins 150, hold the work piece at the work station 94 prior to its being held by the pressure plate 96. As can be seen in FIG. 6a, the work piece 54 is positioned at the work station 94 so as to lie between the extensions 68 and 70 of the individual die units 52 when they are advanced (to the left as viewed in FIG. 6a) to the work station 94.

After the odd-numbered internal control surfaces 36 are formed in the control detent as previously explained, the bar 140, with the control detent thereon, is shifted to the left (as viewed in FIG. 4) to enable the even-numbered control surfaces to be formed in the detent by the particular die units 52 involved. The bar 140 is pulled to the left by the actuator 156 (FIG. 4), which is fluid-operated and is secured to the bolster plate 40. The arm 158 of the actuator 156 is pivotally joined to a conventional coupling 160, which is secured to the near end of the bar 140. Conventional limit stops (not shown) are also used to limit the extent of travel of the bar 140 in both directions to thereby accurately locate the work piece 54 (control detent) relative to the die units 52.

The actuator means for reciprocating the individual die units 52 are shown principally in FIGS. 6a and 6b, taken together, and FIG. 7. Each die unit 52 has its own actuator 162, which is mounted in a frame 164, which is fixed relative to the bolster plate 40 of the die construction 24. The actuator 162 is fluid-operated, and its operating arm 166 is joined to a conventional coupling 168, which, in turn, is joined to a rearward extension 170 of the particular die unit 52 with which it is associated. The rearward extension 170 has a plurality of abutment stops 172 on its underside, as viewed in FIGS. 6a and 6b. The fluid actuator 162 has conduits 174 and 176 connected to opposed ends thereof, which enable the actuator 162 to operate in a conventional manner to reciprocate its arm 166. When an individual actuator 162 is energized to move its associated die unit 52, the actuator's arm 166 moves the die unit to the left (as viewed in FIGS. 6a and 6b) until a stopping means 178 is energized to stop the movement to the left of the die unit and thereby position the particular combination of punch 76 and die insert 72 at the work station 94. In the embodiment shown, all actuators 162 are energized simultaneously by a valve 224 (FIG. 11), which is part of a hydraulic circuit to be described later.

The stopping means 178 for each die unit 52 includes a fluid-operated stop actuator 180 (FIG. 6a), which operates a stop or shot pin 182 to stop the movement of the associated die unit 52 to the left as follows. The stop actuator 180 is secured to a frame support 184, which in turn is secured to the bolster plate 40, and is provided with the usual conduit lines 186 and 188 to reciprocate its operating arm 190, which is pivotally joined to one end of a link 192. The remaining end of the link 192 is pivotally joined to one apex of a triangular link 194, which is pivotally joined at another apex thereof to the frame support 184 by a pin 196. The remaining apex of the link 194 is pivotally joined to one end of a link 197, whose remaining end is pivotally joined to the stop pin 182, which is reciprocatively mounted in a block 198, which, in turn, is secured to the bolster plate 40. As the die unit 52 moves to the left (as viewed in FIG. 6a), counting means 200 (FIGS. 6b and 7), operatively connected with the die units 52, determine the extent of travel of the die units, and, at an appropriate time, control means (to be described later) are effective to energize each stop actuator 180 to thereby bring the stop pins 182 into engagement with the appropriate abutment stops 172 on the die units 52 and thereby position the preselected combination of punch 76 and die insert 72 for each die unit 52 (as controlled by the N/C tape) at the work station 94. When each stop actuator 180 is actuated, its operating arm 190 is pulled inwardly to pivot the triangular link 194 about the pin 196 and thereby force the stop pin 182 upwardly (as viewed in FIG. 6a) into engagement with the pertaining stops 172. Pressure is maintained in the actuators 162 to urge the associated die units against the associated stop pins 182 to thereby maintain alignment of the die units 52 with the work station 94.

After the particular die units 52 are so aligned, the ram 48 descends to perform the forming operation on the work piece 54, as previously explained. After the first forming operation is completed, the ram 48 returns to the home position, shown in FIG. 6a, and the stop actuators 180 are actuated to withdraw the stop pins 182 from the abutment stops 172, and the actuators 162 are then energized to return their associated die units 52 to the home position, shown in FIG. 6a. The work piece 54 is then shifted to the left (as viewed in FIG. 4) by the actuator 156, and the appropriate combination of punch 76 and die insert 72 for each die unit 52 is then shifted into position at the work station 94, where the second forming operation (to form the even-numbered internal control surfaces) is performed. Because only four die units are needed to complete the second forming operation after the work piece 54 has shifted to the left, the rightmost die unit 52 (as viewed in FIG. 4) is held in the home position by its shot pin 182 (FIG. 6a), which enters the abutment stop 272 upon being moved by the associated actuator 180. After the second forming operation, the ram 48 and the die units 52 are returned to their home positions, as previously explained.

The counting means 200, previously alluded to, operate to determine the extent of travel of the die units 52 to the left (as viewed in FIG. 6b) as follows. Each die unit 52 has its own counting bar 202 (FIGS. 6b and 7), which is supported for sliding movement on an elevated support strip 204 (FIG. 6b). The left end of each counting bar 202 is fixed to travel with its associated die unit 52 by a fastener 206, which is secured to the operating arm 166 of the related actuator 162. Each counting bar 202 has a plurality of equally-spaced, aligned slots 208, which are arranged as shown in FIG. 7, and each counting bar 202 has associated therewith a light bulb 210 and a photoelectric or solar cell 212, which are spaced apart to receive the associated counting bar 202 therebetween. The light bulbs 210 are fixed to a support bar 214, while the photoelectric cells 212 are arranged opposite their respective light bulbs and are secured to a crossbar 216 (FIG. 6b), which is fixed to the general frame 164. When actuated by the control means (to be described later), all the actuators 162 are energized simultaneously to force their operating arms 166 and respective die units 52 to the left (as viewed in FIGS. 6b and 7), carrying with them the counting bars 202. As each counting bar 202 passes between its respective light bulb 210 and photoelectric cell 212, the cell will be energized each time a slot 208 passes thereunder, thereby providing a means for determining the extent of travel of the die units to the left (as viewed in FIG. 6b). Each time the photoelectric cell 212 is energized, the resulting electrical impulse is delivered to the control means previously mentioned. When a predetermined number of pulses are received from the photoelectric cell 212 associated with a particular die unit 52, as determined by the requirements of the N/C tape, the control means is effective to actuate the pertaining stop actuator 180, forcing the respective stop pin 182 into engagement with the proper abutment stop 172 on the die unit 52, thereby positioning the particular combination of punch 76 and die insert 72 at the work station 94. With all of the die units 52 positioned in this manner, the actual forming operation proceeds as previously explained. Because there are nine different combinations of punches 76 and related die inserts 72 for each die unit 52 in the embodiment shown, there are nine separate slots 208 provided in each control bar 202. Each die unit 52 also has a home position stop 272 to retain the die unit in the home position if no internal control surface is required for that particular position on the control detent 34.

The actuator means and hydraulic circuit therefor for moving the die units 52 and for firing the stop actuators 180 are shown diagrammatically in FIG. 11. The actuator means includes a conventional source of fluid pressure 218 with a supply conduit 220 and a return conduit 222 being connected to the conventional reversing valve 224, which is shifted by solenoids 226 and 228. When the valve 224 is in the position shown in FIG. 11, the supply conduit 220 is connected to the individual conduits 174 by a conventional fluid distribution network 230, shown in block form. Each conduit 174 is connected to a one-way valve 232, which leads to one end of its associated actuator 162. A suitable return bypass orifice 234 is positioned in bypass relationship with each valve 232. When the fluid enters the actuators 162 from the conduits 174, the fluid moves the associated actuator arms 166, which in turn advance the associated die units 52 towards the work station 94, as previously explained.

As the die units advance towards the work station 94, the stop actuators 180 are energized by the hydraulic circuit shown in FIG. 11. The circuit includes the source of fluid pressure 218 with a supply conduit 236 and a return conduit 238 connected thereto as shown. The supply conduit is connected to the inlet conduits 240 leading to the associated reversing valves 242 via a conventional fluid distribution network 244 (shown in block form). When the valves 242 are in the position shown, fluid under pressure passes through conduits 240, through the one-way valve 246 associated with each stop actuator 180, and through the conduit 186 leading to one side of the stop actuators 180 to move the operating arms 190 thereof and thereby move the pertaining stop pins 182 into engagement with the abutment stops 172 (FIG. 6a) on the associated die units 52 to position them in accordance with the requirements of the N/C tape, as previously explained. Before the stop actuators are energized to stop the movement of the die units towards the work station 94, the reversing valves 242 are in the opposite position from that shown in FIG. 11, so that the stop pins 182 are maintained out of engagement with the abutment stops 172. As the die units 52 move towards the work station 94, the reversing valves 242 are individually moved to the position shown in FIG. 11 by their associated solenoids 248, which are operatively connected to control means to be described later. Each one-way valve 246 has a return bypass orifice 250 in bypass relation therewith. When the reversing valves 242 are in the position shown in FIG. 11, the fluid being vacated from one side of the stop actuators 180 passes through the conduits 188, through the bypass orifices 252, and through their respective reversing valves 242 and return conduits 254 to the distribution network 244, from which it returns to the source 218 via the return conduit 238. Of course, when the solenoids 248 are deactuated, the reversing valves 242 are moved to the opposite position from that shown in FIG. 11 by the solenoids 256, enabling fluid from the inlet conduits 240 to pass through the one-way valves 258 and through the conduits 188 to the individual stop actuators 180 to move them to, and hold them in, the home position, shown in FIG. 6a.

The hydraulic circuit for shifting the work piece at the work station 94 is also shown in FIG. 11. This circuit includes an inlet conduit 260, which is connected to the distribution network 244 and which leads to a reversing valve 262, enabling the fluid to pass through a conduit 264 to one end of the actuator 156 to maintain the work piece 54 in the position shown in FIG. 4. A return conduit 266 from the actuator 156 returns the fluid to the distribution network 244. After the odd-numbered internal control surfaces are formed in the partially-completed control detent, the detent is shifted to the left, as viewed in FIG. 4, to complete the forming of the even-numbered internal control surfaces, as previously explained. This shifting is accomplished by energizing the solenoid 268 to move the reversing valve 262 to the opposite position from that shown in FIG. 11, enabling fluid under pressure to enter the conduit 266, pushing the actuator arm 158 to the left (as viewed in FIGS. 4 and 11) to thereby also shift the work piece (control detent) to the left to position it for the forming of the even-numbered internal control surfaces therein. The solenoid 270 is used to return the reversing valve 262 to the position shown in FIG. 11, in which position the valve is effective to return the work piece to the position shown in FIG. 4. The various limit switches shown in FIG. 11 will be discussed in relation to the control means shown principally in FIG. 13.

The control means for controlling the operation of the trimming and forming operations is shown in block form principally in FIG. 13. As previously mentioned, all the information for the trimming and forming operations to be performed on the control detents is recorded on a record medium; that is, the N/C tape previously mentioned. In the embodiment shown, the record medium is a multi-track or channel paper tape having information recorded therein by the presence or absence of holes punched therein. For the present, assume that the trimming operation on a specific control detent has already been performed at the trim die construction 22 (FIG. 1) and that the partially completed control detent is properly positioned in the die construction 24 to have the internal control surfaces formed therein. A suitable switch LS8 (FIG. 13), operatively connected to the ram of the press in which the die construction 22 is located, can be used to indicate that the trimming operation has been performed, and a signal passing through this switch can be used to partially condition the tape reader control 274, shown in FIG. 13. The actual circuit of the tape reader control 274 may be conventional, as it does not form a part of this invention. The tape reader control 274 is also partially conditioned by the slide home switches 276 (for the die construction 24) shown in FIGS. 6b and 13; one such switch 276 is provided for each of the five die units 52. All five switches 276 and the switch LS8 must be closed to condition the tape reader control 274 to move the N/C tape.

When the operator is ready to initiate the forming operation at the die construction 24, he closes the switches 278 and 280, which energize the tape reader control 274 (FIG. 13), which has a conventional tape feed mechanism (not shown) to index the N/C tape in the tape reader 282. The information read from the tape at the reader 282 is forwarded to a conventional address circuit 284, which routes it to the die command 286. Whether the information is routed to the die command 286 for the die construction 24 or the die command 288 is controlled by an appropriate code in the tape. The die command 286 is a register composed of groups of conventional flip-flop circuits arranged in binary form, one such group of flip-flops being provided for each of the five die units 52 of the die construction 24. Codes in the N/C tape indicate which of the flip-flops are to be set; that is, placed in the "on" position for those die units 52 which are to advance to the work station 94. For example, the coded information in the N/C tape may indicate that the rightmost die unit 52 (as viewed in FIG. 4) is to be stopped so as to position the fourth combination of punch 76 and die insert 72 (as counted from left to right in FIG. 6a) at the work station 94. In this situation, those flip-flops associated with this slide which reflect a binary count of four would be appropriately placed in the "on" position. Because there are nine different punch and die combinations possible for each unit 52, four such flip-flops are used for the binary designations thereof. The N/C tape has a terminal signal or end of block signal, hereinafter called an EOB signal, which is used to indicate the termination of a group of instructions. When this EOB signal is received at the die command 286, it sets a flip-flop therein which is used to energize the solenoid 226 (FIG. 11), which shifts the reversing valve 224 to the position shown, which, in turn, supplies fluid under pressure to the conduits 174, thereby moving all the die units 52 simultaneously towards the work station 94, as previously explained. The hydraulic cylinders 162 for the die units 52 are collectively represented by the block 290 in FIG. 13.

As the individual die units 52 are moved towards the work station 94, the counting means 200 (FIGS. 6b and 7), previously mentioned, are utilized to stop the die units 52 so that the right combinations of punches 76 and die inserts 72 will be positioned at the work station. Each of the photoelectric cells 212 of the counting means 200 (FIG. 6b) is operatively connected to its own binary step-up counter (not shown), which is part of a conventional comparator circuit 292 (shown only in block form in FIG. 13). Accordingly, one such step-up counter exists for each die unit 52. Each such step-up counter may be of the conventional self-steering variety of flip-flops which performs a straight binary counting function upon receiving successive on and off pulses from its associated photoelectric cell. The comparator circuit also includes a conventional and/or circuit (not shown) for each die unit 52, to receive the outputs from their associated register in the die command 286 and the associated binary step-up counter. When a sufficient number of pulses is received from a particular photoelectric cell 212, the output from its associated step-up counter will match the output from its associated register in the die command 286, causing its associated and/or circuit in the comparator 292 to energize its associated solenoid 248 (FIG. 11), which shifts its associated reversing valve 242 to the position shown, thereby energizing its associated actuator 180. When energized, the actuator 180 moves its stop pin 182 (FIG. 6a) into engagement with the pertaining stop 172 on the die unit 52 to stop its movement towards the work station 94 and thereby position the selected combination of punch 76 and die insert 72 at the work station 94. The setting of the stop pins 182 is shown diagrammatically by the block 293.

The die command 286 also includes conventional AND gates and flip-flops (not shown), which are set by signals from the N/C tape and received by the AND gates to thereby energize either solenoid 268 or solenoid 270 (FIG. 11), which control the movement of the work station 94. When the solenoid 270 is energized, the work station 94 is moved to the right, as viewed in FIGS. 4 and 13, and, when the solenoid 268 is energized, the work station is moved to the left. The work station 94 also has two monitoring switches 294 and 296 associated therewith, as shown in FIGS. 4 and 11, which switches are used to verify the physical location of the work station. These monitoring switches 294 and 296 are represented in FIG. 13 by the block 298. The movement of the work station 94 either to the right or to the left may take place during the movement of the die units 52 thereto; however, the punch press 24 will not be conditioned to enable the ram 48 to descend towards the work station 94 until a verification is made to insure that all the stop pins 182 for the individual die units have been "fired" and the physical location of the work station 94 is positioned in accordance with the requirements on the N/C tape.

The verification prior to conditioning the press to enable the ram to descend is accomplished as follows. Each of the solenoids 248, which pull their respective reversing valves 242 to the position shown in FIG. 11, also has associated therewith relay contacts 300 (not shown), which are closed whenever the solenoid is energized, indicating that the associated actuator 180 and stop pins 182 have been "fired" to stop the movement of the pertaining die unit 52 towards the work station 94. These relay contacts 300 are connected in series, so that a current will pass therethrough only when all stop pins 182 are fired. Each of the solenoids 268 and 270 has relay contacts 302 (not shown) associated therewith, which are also closed when its associated solenoid is energized. When the solenoid 270 is energized, for example, a verification current is sent through the relay contacts 300 (connected in series), through the relay contacts 302 associated with the solenoid 270, and, if the work station 94 is physically located to the right (as viewed in FIG. 11), the current will also pass through the now-closed monitor switch 294 to energize a relay 304 (not shown), which is effective to energize a light bulb 306 (FIG. 13) and to condition a conventional fail-safe device 308 (FIG. 13), indicating that the die construction 24 is ready for the first of two forming operations to be performed on the partially completed control detent 34 (FIG. 9) inserted therein. The operator at the die construction 24 then closes the two switches 310 and 312 (FIGS. 11 and 13), and the ram 48 of the press descends to perform the first forming operation, as previously explained.

After the first forming operation is performed on the die construction 24, the ram of the press 48 is raised to move away from the work station 94, and, in the process of moving away, it momentarily actuates a reset switch LS17 (FIGS. 11 and 13). Actuation of this switch LS17 is effective (a) to deenergize the solenoid 226 on the reversing valve 224 associated with the actuators 162 for the die units 52; (b) to deenergize the solenoids 248 associated with the reversing valves 242, which in turn are associated with the actuators 180 for the stop pins 182; and (c) to energize the solenoids 256 and the solenoid 228. Energization of the solenoids 256 (FIG. 11) is effective to withdraw the stop pins 182 from the abutment stops 172 (FIG. 6a), and energization of the solenoid 228 (FIG. 11) is effective to return the die units 52 to the home position. Actuation of the switch LS17 also indirectly deenergizes the relay 304, which shuts off the light bulb 306 (FIG. 13) and blocks the fail-safe device 308 to prevent accidental tripping of the press.

When the die units 52 reach the home position, shown in FIGS. 6a and 6b, each counting bar 202 actuates its home position switch 276, which resets the registers in the die command 286 (FIG. 13) and the binary step-up counters in the comparator circuit 292, and also conditions the tape reader control 274 for the second forming operation, as previously mentioned. When the switches 278 and 280 are again closed, FIG. 13, the process of advancing the die units 52 to the work station will be repeated as already described to perform the forming operation on the even-numbered internal control surfaces of the control detent to produce the completed detent 38 shown in FIG. 10.

After completing the forming operation on the control detent 38, another detent blank 28 is placed in the die construction 22, and the trimming operation is performed thereon as previously explained. The die construction 22 may be conventional to perform the trimming operation.

Figure 14:
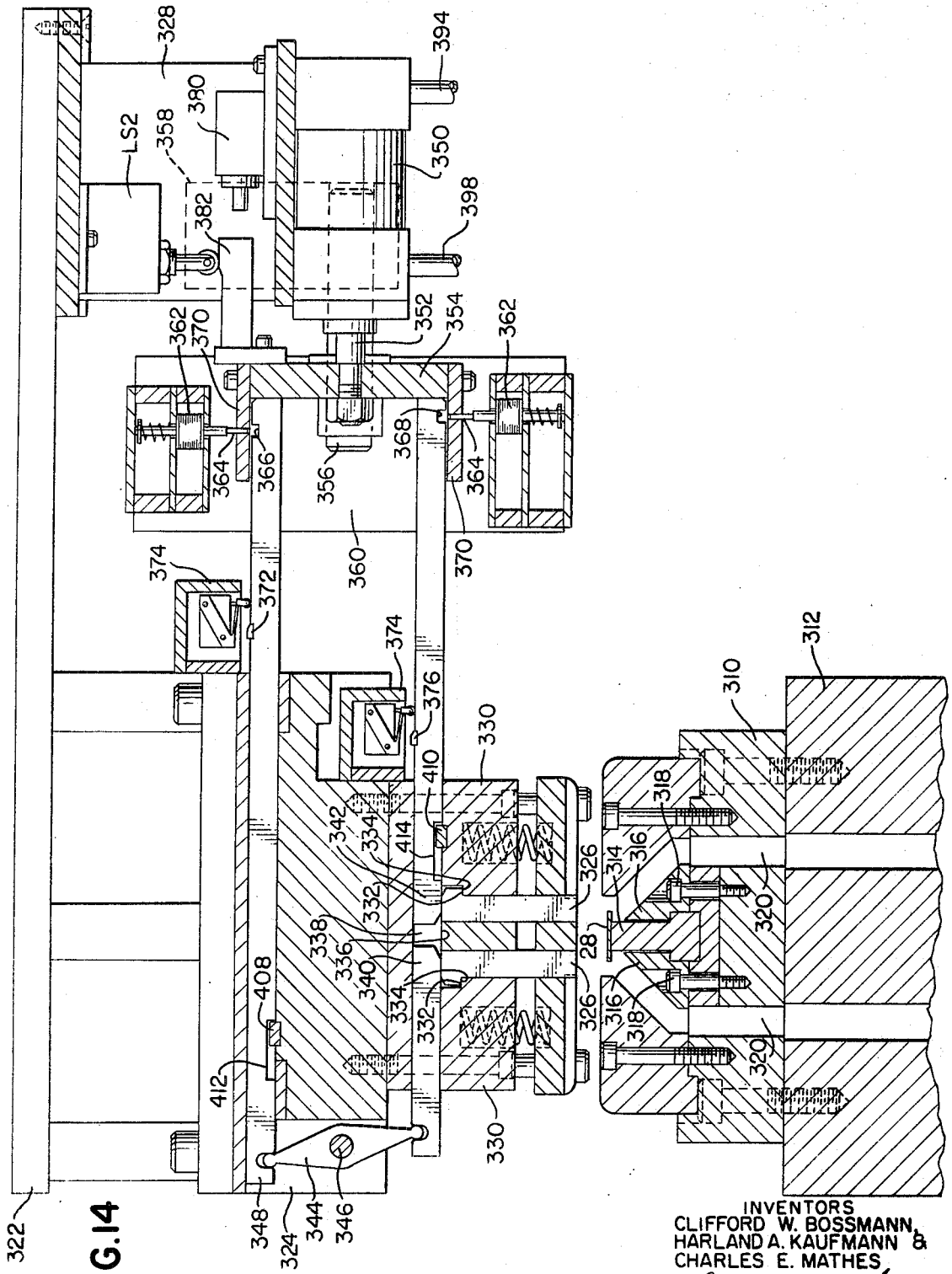
FIG. 14 is a cross-sectional view of the trimming die construction used in the production of the control detents.

As previously mentioned, the die construction 22 is effective to trim off the unwanted external control surfaces such as 30 on the control detent blank 28 (FIG. 8), and this die construction 22 is shown only generally in FIG. 14. The die construction 22 (shown in cross-section in FIG. 14) includes a base portion 310, which is secured to the bed 312 of a press. The shearing block 314, on which the control detent blank 28 is positioned, is secured to the base portion 310 by the blocks 316 and fasteners 318, as shown, the usual slots 320 being provided for waste removal.

The movable portion of the die construction 22 has a plate 322, which is secured to the ram of a press (not shown). Two supporting structures depend from this plate 322, one of them being the support member 324 for supporting the shearing punches 326, and the other being the support member 32 for supporting a slide actuator mechanism to be described later.

The punches 326 are slidably mounted in a block 330, which is secured to the support member 324. Each punch 326 has on one side thereof a shoulder 332 (as shown in FIG. 14), which rests on a cooperating shoulder 334 on the block 330 to retain the punches in the block 330. When resting on the shoulders 334, the tops of the punches 326 (as viewed in FIG. 14) are flush with the surface 336 of the block 330, which surface is part of a rectangular groove 338, in which the punch back-up members 340 and 342 are slidably mounted. When these back-up members 340 and 342 are in the positions shown in FIG. 14, the punches 326 are backed up or supported thereby, and, when the press ram and the plate 322 move towards the control detent blank 28 for the trimming operation, the punches 326 will be effective to shear off the unwanted external control surfaces on the blank.

In the embodiment disclosed herein, fifty-one external control surfaces are present on the control detent blank 28 (FIG. 8), and, accordingly, one such punch 326 is provided for each such external control surface. These external control surfaces appear on opposite sides of the blank and extend along the length thereof. When looking at FIG. 14, the punches 326 positioned above the blank 28 to shear off the control surfaces extending over the left side of the shearing block 314 may be considered the front row of external control surfaces, and, accordingly, the surfaces extending over the right side of the block 314 may be considered the rear row of control surfaces. While only one punch 326 is shown for the front row, to simplify the drawing, one such punch 326 is provided for each control surface of the front row, and, similarly, one punch 326 is provided for each control surface of the rear row. The number of external control surfaces in the front and rear rows is determined by the requirements of the business machine in which the group of control detents will be used. The front and rear rows of punches 326 (FIG. 14) extend along lines which extend into the drawing.

When particular external control surfaces are to be left on the control detent 34 (FIG. 9), the associated punches 326 must be incapacitated to prevent their shearing off these desired elements, and the means for accomplishing this is also shown in FIG. 14. As previously mentioned, one punch back-up member 340 is provided for each punch 326 in the front row, and one punch back-up member 342 is provided for each punch 326 in the rear row. Each back-up member 340 of the front row has one end pivotally joined to one end of a link 344, which is pivotally mounted on a pin 346, which in turn is secured to the support member 324. The remaining end of the link 344 is pivotally joined to one end of an upper bar 348, which is slidably mounted in a cooperating opening passing through the support member 324. One such punch link 344 and bar 348 is provided for each punch 326 of the front row. When a bar 348 is pulled to the right (as viewed in FIG. 14) by actuator means to be later described, the associated back-up bar 340 will be pulled to the left by the link 344. When pulled to the left, the back-up bar 340 slides in the groove 338 away from over its respective punch 326, thereby incapacitating or breaking the solid connection between the punch 326 and the block 330. When the plate 322 descends, due to actuation of the press in which the die construction 22 is used, the punch 326, which has been incapacitated, rests on the blank 28 while the block 330 descends and will not shear off the external feature associated with that particular punch. The actuator means depending from the support member 328 is effective to selectively actuate the bars 348, so that selected external control surfaces may be left on the control detent blank 28 in response to control by the N/C tape previously mentioned.

The rear row of punches 326 (FIG. 14) is similarly incapacitated; however, the punch back-up members 342 for those punches to be incapacitated are merely pulled to the right (as viewed in FIG. 14) by the actuator means depending from the support member 328.

The actuator means depending from the support member 328 (FIG. 14) includes a fluid actuator 350 secured thereto. The actuator 350 has an operating arm 352, which is secured to a block 354, which is reciprocatably mounted on spaced parallel rods 356 (only one of which is shown in FIG. 14), which in turn are slidably mounted in a support member 358, shown in dashed outline. When the actuator 350 is energized to incapacitate the punches 326, the block 354 will be pulled to the right (as viewed in FIG. 14), and the two rods 356 will slide in the support member 358 and maintain alignment of the block 354. There is a support structure 360, which is secured to the block 354 to be reciprocated therewith and which is used to support an upper row of solenoids 362 and a lower row of solenoids 362. Whenever a particular external feature is to be left on the control detent blank 28, the solenoid 362 associated with that feature will be energized by the control means shown generally in FIG. 13. When a solenoid 362 in the upper row, for example, is energized, its associated plunger 364 advances into a notch 366 in the associated bar 348. Similarly, when a solenoid 362 in the lower row is energized, its associated plunger 364 advances into a notch 368 in one end of the punch back-up member 342. All the solenoids 362, representing those external features to be left on the control detent blank 28, are energized at one time in response to the N/C tape. When so energized, the actuator 350 is then energized to move its arm 352 to the right, as viewed in FIG. 14. Because the plungers 364 of the energized solenoids 362 are in their respective notches, the related upper bars 348 and punch back-up members 342 will be pulled to the right along with the block 354 and the actuator arm 352 to thereby incapacitate the associated punches 326, as previously explained. The plungers 364 of each row of solenoids 362 are supported to prevent the bending thereof when moved by the actuator 350, by having each plunger 364 slidably mounted in a suitable aperture in a plate 370, which is secured to the block 354. For those external control surfaces on the control detent blank 28 which are to be trimmed or sheared off, the solenoids 362 associated therewith would not be energized, and, accordingly, the related punch back-up members 340 and 342 would remain in the positions shown in FIG. 14 to back up their respective punches to effect the trimming operation.

When a particular upper bar 348 is pulled to the right (as viewed in FIG. 14), a cam surface 372 thereon is used to actuate a switch 374, which is used in conjunction with the control circuit of FIG. 13 to monitor the particular associated punch 326 of the front row to insure that the correct external control surface will be left on the blank 28 in accordance with the requirements of the N/C tape. A similar cam surface 376 on each punch back-up member 342 is also similarly used to monitor the particular associated punches 326 of the rear row of punches. The actuator 350 also has switches LS2 and 380, which monitor its position and are used in conjunction with the control circuit of FIG. 13. An arm 382, fixed to the block 354, is used to actuate the switches LS2 and 380.

The pneumatic circuit for energizing the actuator 350 is conventional and is shown only generally in FIG. 12. The circuit includes a conventional source 384 of air under pressure, having supply conduits 386 and 388 connected thereto as shown. When the solenoid 390 is energized, the reversing valve 392 is positioned as shown, so that air under pressure passes therethrough to the conduit 394, through the one-way check valve 396, and to the actuator 350 to effectively back up the punches 326, as shown in FIG. 14. Air escaping from the opposite side of the actuator 350 passes out through the conduit 398 and the bypass 400 and returns to the source 384, where it is discharged into the atmosphere. When the solenoid 402 is energized, the reversing valve 392 is shifted to the opposite position from that shown in FIG. 12, to deliver air under pressure to the conduit 398 via the check valve 404, and, accordingly, the actuator 350 is moved to the right (as viewed in FIG. 14) to incapacitate the selected punches as previously explained. In this circumstance, air, leaving the actuator, passes out the conduit 394 through the bypass 406 and returns to the source 384, where it is discharged into the atmosphere. The extent of travel of the actuator 350 is governed by stops 408 and 410 (FIG. 14), which cooperate with recesses 412 and 414 in each of the upper bars 348 and punch back-up members 342, respectively. In FIG. 12, the switches 374 and the solenoids 362 are shown diagrammatically, it being understood that there is one of each for each punch 326 shown in FIG. 14.

The control means for controlling the operation of the trimming operation is also shown in block form in FIG. 13. As previously mentioned, all the information for the trimming operation to be performed on the control detents is recorded on the record medium; that is, the N/C tape previously mentioned. In the embodiment shown, the record medium is a multi-track or channel paper tape having information recorded therein by the presence or absence of holes punched therein. For the present, assume that the forming operation is completed on a control detent, and a new blank 28 is inserted in the trimming die construction 22 (FIG. 1). At this time, the switch LS17 (FIG. 13), connected to the ram of the press associated with the die construction 24, will partially condition the tape reader control 274, which is also partially conditioned by the slide home switches 276 associated with the die construction 24 and the switch LS2 associated with the die construction 22. When these switches LS17, 276, LS2, and 274 are closed, the operator can initiate the trimming operation, which he does by closing the switches 278 and 280 to energize the tape reader control 274.

When the tape reader control 274 is energized, a conventional tape feed machanism (not shown) is also energized to index the N/C tape in the tape reader 282 (FIG. 1). The information read from the tape at the reader 282 is forwarded to the address circuit 284, which, because of a code in the tape, routes the information to the die command 288, which is associated with the trimming die construction 22. The die command 288 is composed of a group of conventional AND gates and logic circuits, and also includes a conventional binary step-up counter which is used to count row positions as the N/C tape is fed through the tape reader 282. Because there are fifty-one solenoids 362 (FIG. 14) to be controlled in the embodiment disclosed herein, eleven rows in the N/C tape are needed to identify the solenoids 362 to be energized, as previously explained. In this disclosure, a row of information is read each time the N/C tape is advanced along its length one increment, with five tracks (positioned across the width of the tape) being provided to identify the solenoids 362 to be energized. For example, when the binary step-up counter records a count of "one," a hole in the N/C tape in track one will be effective to condition associated AND gates to energize a control relay 416 (not shown), which controls its associated solenoid 362 for punch position 1. One such control relay 416 is provided for each solenoid 362, and these control relays are shown collectively in FIG. 13 by the block 418. Similarly, a hole in track two (when the binary step-up counter is at count one) will energize an associated control relay 416, which controls its associated solenoid 362 for punch position two. When the binary step-up counter reaches a count of eleven( (due to eleven incremental advances of the N/C tape) a hole appearing in track one will energize an associated control relay 416, which controls its associated solenoid 362 for punch position fifty-one. In the embodiment of the die construction 22 shown in FIG. 14, there may be twenty-six punches 326 in the front row representing punch positions one through twenty-six, and twenty-five punches 326 in the rear row representing punch positions twenty-seven through fifty-one, the actual grouping of punches 326 being dictated by design requirements.

Each of the control relays 416 has a normally open switch 420 (not shown), which is closed when the relay is energized. These switches 420 are used to condition their respective solenoids 362, so that they can be energized collectively, as previously explained, and are also used in connection with a conventional comparator 422 (FIG. 13), which includes AND gates. The closing of the switches 420 also partially conditions their associated AND gates in the comparator 422, so that a comparison can be made of those solenoids 362 which are to be energized with the requirements of the N/C tape. When the EOB signal is reached in the N/C tape, an energizing relay 424 (not shown) is energized to close its associated switch 426 (not shown), which thereby energizes all the solenoids which have been conditioned to be energized, and the relay 424 also energizes the solenoid 402 (FIG. 12) and a conventional timer 428 (FIG. 13). The timer 428 permits only momentary energization of the solenoids 362 (FIG. 14) and also provides for a slight delay before the solenoid 402 is energized to shift the reversing valve 392 to the opposite position from that shown in FIG. 12 to energize the actuator 350 (FIG. 14), which in turn pulls the associated upper bars 348 and punch back-up members 342 to the right, as viewed in FIG. 14, and holds them there, as previously explained, to thereby close their associated monitor switches 374 (FIG. 14). The movement of the bars 348 and back-up members 342 is represented in FIG. 13 by the block 430, marked Slide Advance, and the shutting off of the solenoids 362 is represented by the block 431. The closing of the monitor switches 374 is utilized in the comparator 422 (FIG. 13) to verify that the particular punches 326 which should be incapacitated (to leave on the associated external control surface) have in fact been incapacitated. When the verification for all the punches 362 has been completed, and the verification of the movement of the supporting structure 360 (FIG. 14) has also been conventionally verified by the monitor switch 380, a "go" light 432 (FIG. 13) is energized, and a conventional fail-safe device 434 (FIG. 13) is conditioned to enable the press in which the die construction 22 is located to be operated. The operator then closes the switches 436 and 438 to cause the ram of the press to descend to complete the trimming operation. After the ram of the press moves away from the die 22, it actuates the switch LS8, which resets the die command 288, causing the reversing valve 392 (FIG. 12) to be shifted to the position shown to return the support structure 360 to the position shown in FIG. 14. When the support structure 360 returns home, the switch LS2 (FIGS. 13 and 14) will be actuated to condition the tape reader control 274 for the forming operation, as previously explained. Also, when the support structure returns home, the switch LS8, operatively connected to the ram of the press for the die construction 22, will be actuated to reset the control relays 416.

While two forming operations are performed on the die construction 24, the production of a set of control detents can be accelerated by utilizing another die construction 442 (not shown) similar to the die construction 24 except that the shifting work station 94 can be replaced by a stationary one. In this arrangement, the die construction 22 would perform the trimming operation, as previously explained, and the die construction 24 would be utilized to form the odd-numbered internal control surfaces. Instead of shifting the control detent in the work station 94, it can be transferred to the second die construction 442, in which the forming of the even-numbered internal control surfaces can take place. By this arrangement, a better balance of the work load at each die construction can be had, and a completed control detent will be had for each usage of the three die constructions.

While the form of the invention shown and described herein is admirably adapted to fulfill the objects primarily stated, it is to be understood that it is not intended to confine the invention to the form or embodiment disclosed herein, for it is susceptible of embodiment in various other forms.

What is claimed is:

1. A die construction comprising:
   a base member adapted to be secured to the bed of a press and having a pair of parallel supports upstanding therefrom;
   a plurality of die units mounted in parallel relationship with one another between said supports for reciprocating movement parallel thereto;
   each said die unit comprising:
      a lower half and an upper half joined together at one end thereof with each said half having an extension which is spaced from the extension of the other said half so as to receive a work piece therebetween;
      said extension of said lower half having a plurality of die means spaced along the length thereof;
      said extension of said upper half having a plurality of punch means spaced along the length thereof so that each said punch means is aligned with a particular one of said die means so as to form cooperating die sets;
   carrier means mounted on said base member for holding a work piece at a work station on said base;
   actuator means for each said die unit for selectively moving each die unit toward said work station so as to position and hold a particular die set at said work station so that the pertaining punch and die means thereof will be positioned on opposite sides of said work piece;
   and an upper planar means adapted to be secured to a ram of a press, and being mounted on said base member for reciprocating movement relative thereto, said upper planar means, upon being moved towards said base member, being adapted to simultaneously move all said punch means towards their respective die means for those said die sets which are positioned at said work station to thereby work on said work piece.

2. The die construction as claimed in claim 1 in which said die units are arranged in side-by-side relation with adjacent die units engaging each other and with the outermost ones of said die units engaging said parallel supports.

3. The die construction as claimed in claim 1 in which said carrier means is shiftably mounted on said base member, and further includes means for shifting said carrier means in a direction which is perpendicular to the movement of said die units.

4. The die construction as claimed in claim 1 in which each said die unit has a stripper plate which is common to all said die sets thereon, and
   means to bring said stripper plate into engagement with said work piece before it is worked upon by said die sets, and to yieldably maintain said stripper plate in engagement with said work piece until said punch means are moved away from said work piece after working thereon.

5. The die construction as claimed in claim 1 in which said upper planar means includes a first planar member which is adapted to be secured to said ram, and a second planar member which is positioned between said first planar member and said die units,
   said first and second planar members having mounting means thereon for maintaining them in parallel relationship with said base member as said ram moves said upper planar means towards said base member.

6. The die construction as claimed in claim 5 in which said second planar member has a plurality of aligned grooves therein which are parallel to said parallel supports, and in which die construction said base member has a plurality of aligned guide members thereon which are parallel to said parallel supports;
   said lower halves of said die units having grooves therein to cooperate with said guide members to enable said lower halves to be reciprocated while being restrained from movement away from said base member,
   each said punch means having a withdrawal pin projecting therefrom which is adapted to cooperate with the pertaining one of said grooves in said second planar member to enable said die units to reciprocate, and to withdraw said punch means from the die means of the pertaining die set upon movement of said upper planar means away from said base member after said work piece is worked upon.

7. The die construction as claimed in claim 6 in which each said punch means further comprises:
   a working member and a bushing member being secured together by its pertaining said withdrawal pin, and being slidably mounted in said extension of said upper half for movement towards and away from the die means of the pertaining said die set;
   said bushing member being shaped to prevent rotation thereof relative to said upper half;
   means joining said bushing member with its pertaining working member to prevent rotation therebetween;
   said bushing member having spring means to urge its associated working member away from said die means of the pertaining said die set;
   said second planar member having hardened areas aligned with said work station and adapted to engage those bushing members which are aligned with said work station to thereby move them and their associated working members towards said base member into working engagement with said work piece.

8. The die construction as claimed in claim 1 in which said actuator means for each said die unit comprises:
   resilient drive means for yieldably moving the pertaining die unit towards said work piece in response to actuation by a control means; and
   stopping means cooperating with said base member and said die unit so as to stop the motion of said die unit towards said work piece in response to actuation by said control means so as to position a preselected one of said die sets at said work station.

9. The die construction as claimed in claim 8 in which each said die unit has a plurality of spaced abutment stops thereon;
   said stopping means includes a pin slidably mounted in said base member and movable into and out of engagement with said abutment stops;
   an actuator for moving said pin into and out of engagement with said abutment stops in response to actuation by said control means;
   and counting means to measure the extent of travel of said die unit towards said work piece and adapted to be operatively connected to said control means.

10. The die construction as claimed in claim 9 in which said counting means includes:
- a bar secured to each said die unit to be reciprocated therewith, and having holes spaced along the length thereof,
- a light source and a light-responsive member positioned for each said die unit positioned on opposed sides thereof so as to enable said light-responsive member to be energized only when light from said source passes through one of said holes as the pertaining said die unit is moved towards said work piece by its associated said resilient drive means.

References Cited

UNITED STATES PATENTS 2,219,908  10/1940  Ryan _____ 83—549

WILLIAM S. LAWSON, Primary Examiner

U.S. Cl. X.R.

83—133, 549, 560, 620